(12) United States Patent
Miller (10) Patent No.: US 12,281,636 B2
(45) Date of Patent: Apr. 22, 2025

(54) METHOD OF SERVICING OR INSTALLING A COMPONENT OF A WIND TURBINE USING A CRANE

(71) Applicant: General Electric Renovables Espana, S.L., Barcelona (ES)

(72) Inventor: Alexander Miller, Salzbergen (DE)

(73) Assignee: GENERAL ELECTRIC RENOVABLES ESPAÑA S.L., Barcelona (ES)

( * ) Notice: Subject to any disclaimer, the term of this patent is extended or adjusted under 35 U.S.C. 154(b) by 0 days.

(21) Appl. No.: 18/735,354

(22) Filed: Jun. 6, 2024

(65) Prior Publication Data
US 2024/0410335 A1 Dec. 12, 2024

(30) Foreign Application Priority Data

Jun. 7, 2023 (EP) .................................... 23177980

(51) Int. Cl.
*F03D 13/10* (2016.01)
*F03D 80/50* (2016.01)

(52) U.S. Cl.
CPC ........... *F03D 13/139* (2023.08); *F03D 80/50* (2016.05); *F03D 13/104* (2023.08); *F03D 13/116* (2023.08); *F03D 13/122* (2023.08); *F05B 2230/61* (2013.01)

(58) Field of Classification Search
CPC .................................................. F05B 2230/61
See application file for complete search history.

(56) References Cited

U.S. PATENT DOCUMENTS

| | | | |
|---|---|---|---|
| 8,851,309 B2 * | 10/2014 | Pedersen | B66C 23/207 212/223 |
| 11,300,104 B2 * | 4/2022 | Reynolds | B66C 1/108 |
| 11,454,217 B2 * | 9/2022 | Svinth | F03D 13/10 |
| 11,459,216 B2 * | 10/2022 | Aitken | B66C 23/185 |
| 11,946,454 B2 * | 4/2024 | Buffkin | F03D 80/50 |
| 12,065,333 B2 * | 8/2024 | Maij | F03D 13/10 |

(Continued)

FOREIGN PATENT DOCUMENTS

| CA | 3154176 A1 * | 4/2022 | ............ B66C 1/108 |
|---|---|---|---|
| EP | 2871357 B1 | 5/2016 | |

(Continued)

OTHER PUBLICATIONS

European Search Report Corresponding to EP23177980 on Oct. 30, 2023.

*Primary Examiner* — Jacob J Cigna
(74) *Attorney, Agent, or Firm* — Dority & Manning, P.A.

(57) ABSTRACT

A method (100) of servicing or installing a component of a wind turbine (10) using a crane (50), the wind turbine (10) comprising a nacelle (16) and a rotor hub (20) coupled to the nacelle (16) and rotatable about a rotor axis, the method (100) comprising rotating the rotor hub (20) about the rotor axis to a first rotational position; lifting the crane (50) to the rotor hub (20) while the rotor hub (20) is positioned at the first rotational position; mounting the crane (50) to a mounting portion (21) of the rotor hub (20) while the rotor hub (20) is positioned at the first rotational position; and rotating the rotor hub (20) together with the crane (50) from the first rotational position to a second rotational position.

11 Claims, 8 Drawing Sheets

(56) References Cited

U.S. PATENT DOCUMENTS

| | | | |
|---|---|---|---|
| 2010/0254813 A1* | 10/2010 | Dawson | ............ F03D 13/10 29/889.1 |
| 2011/0200435 A1 | 8/2011 | Pedersen | |
| 2012/0073134 A1 | 3/2012 | Bywaters et al. | |
| 2023/0079878 A1 | 3/2023 | Fenger et al. | |
| 2023/0332575 A1* | 10/2023 | Aitken | ............ B66C 1/108 |

FOREIGN PATENT DOCUMENTS

| | | | |
|---|---|---|---|
| WO | WO2019/166066 A1 | 9/2019 | |
| WO | WO-2021168549 A1 * | 9/2021 | ........... B66C 23/207 |

* cited by examiner

METHOD OF SERVICING OR INSTALLING A COMPONENT OF A WIND TURBINE USING A CRANE

FIELD

The present disclosure relates generally to wind turbines, and more particularly to a method of servicing or installing a component of a wind turbine using a crane, and a crane for a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During installation, removal or service of components of a wind turbine, cranes are typically used for moving the components, particularly for lifting the components from ground to the hub or the nacelle, or for lowering the components from the hub or the nacelle to the ground. The use of a large ground-based crane can be very expensive and typically involves time-consuming transport to the wind turbine site, as well as assembly and disassembly of the crane on-site. Alternatively, an uptower service crane may be used, which can be lifted in parts to the nacelle, where the service crane is assembled on or in the nacelle.

However, the use of known service cranes that can be lifted to the nacelle may involve time-consuming procedures such as lifting several parts up to and down from the nacelle, and manual assembly and disassembly uptower. Known service cranes may also reduce the amount of available space in the nacelle for performing servicing operations. Further, cranes mounted in or on the nacelle may render access to some areas of the nacelle more difficult, for example access to the hatch from the nacelle to the tower which may serve as an escape route from the nacelle.

Accordingly, the present disclosure is directed to a crane and to a method of mounting a crane on a wind turbine that may reduce an on-site crane assembly time, reduce a crane transportation effort, increase the available space uptower during servicing or installation, provide increased safety, and/or provide a cost-efficient installation and/or servicing of one or more components of a wind turbine.

BRIEF DESCRIPTION

Aspects and advantages of the invention will be set forth in part in the following description, or may be obvious from the description, or may be learned through practice of the invention.

In one aspect, the present disclosure is directed to a method of servicing or installing a component of a wind turbine using a crane. The wind turbine includes a nacelle and a rotor hub. The rotor hub is coupled to the nacelle and rotatable about a rotor axis. The method includes rotating the rotor hub about the rotor axis to a first rotational position. The method includes lifting the crane to the rotor hub while the rotor hub is positioned at the first rotational position. The method further includes mounting the crane to a mounting portion of the rotor hub while the rotor hub is positioned at the first rotational position. The method includes rotating the rotor hub together with the crane from the first rotational position to a second rotational position. It should be understood that the method may further include any of the additional steps and/or features as described herein.

In a further aspect, the present disclosure is directed to a crane for a wind turbine. The crane includes a crane base configured for mounting the crane to a rotor hub of the wind turbine. The crane further includes a crane arm connected to the crane base. The crane base includes a connection portion configured for fastening the crane base to the rotor hub while the crane is oriented with the connection portion facing in an upward direction. It should be understood that the crane may further include any of the features as described herein and/or may be configured for any of the operations of the methods described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
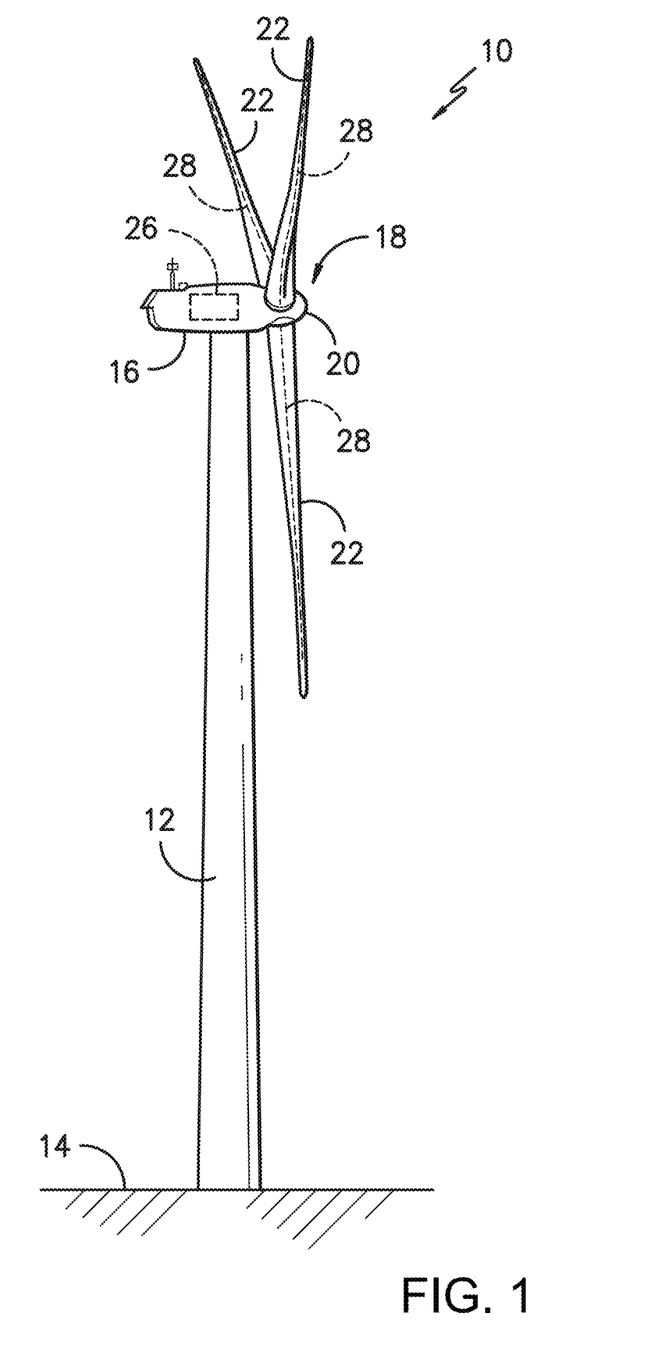
FIG. 1 illustrates a perspective view of a wind turbine.

Referring now to the drawings, FIG. 1 illustrates a perspective view of a wind turbine 10 according to the present disclosure. As shown, the wind turbine 10 generally includes a tower 12 extending from a support surface 14 (for example ground), a nacelle 16 mounted on the tower 12, and a rotor 18 coupled to the nacelle 16.

As shown in FIG. 1, the rotor 18 includes a rotatable rotor hub 20 and at least one blade 22 coupled to and extending outwardly from the rotor hub 20. For example, in the illustrated embodiment, the rotor 18 includes three blades 22. However, in an alternative embodiment, the rotor 18 may include more or less than three blades 22. Each blade 22 may be spaced about the rotor hub 20 to facilitate rotating the rotor 18 to enable kinetic energy to be transferred from the wind into usable mechanical energy, and subsequently, electrical energy. For instance, the rotor hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
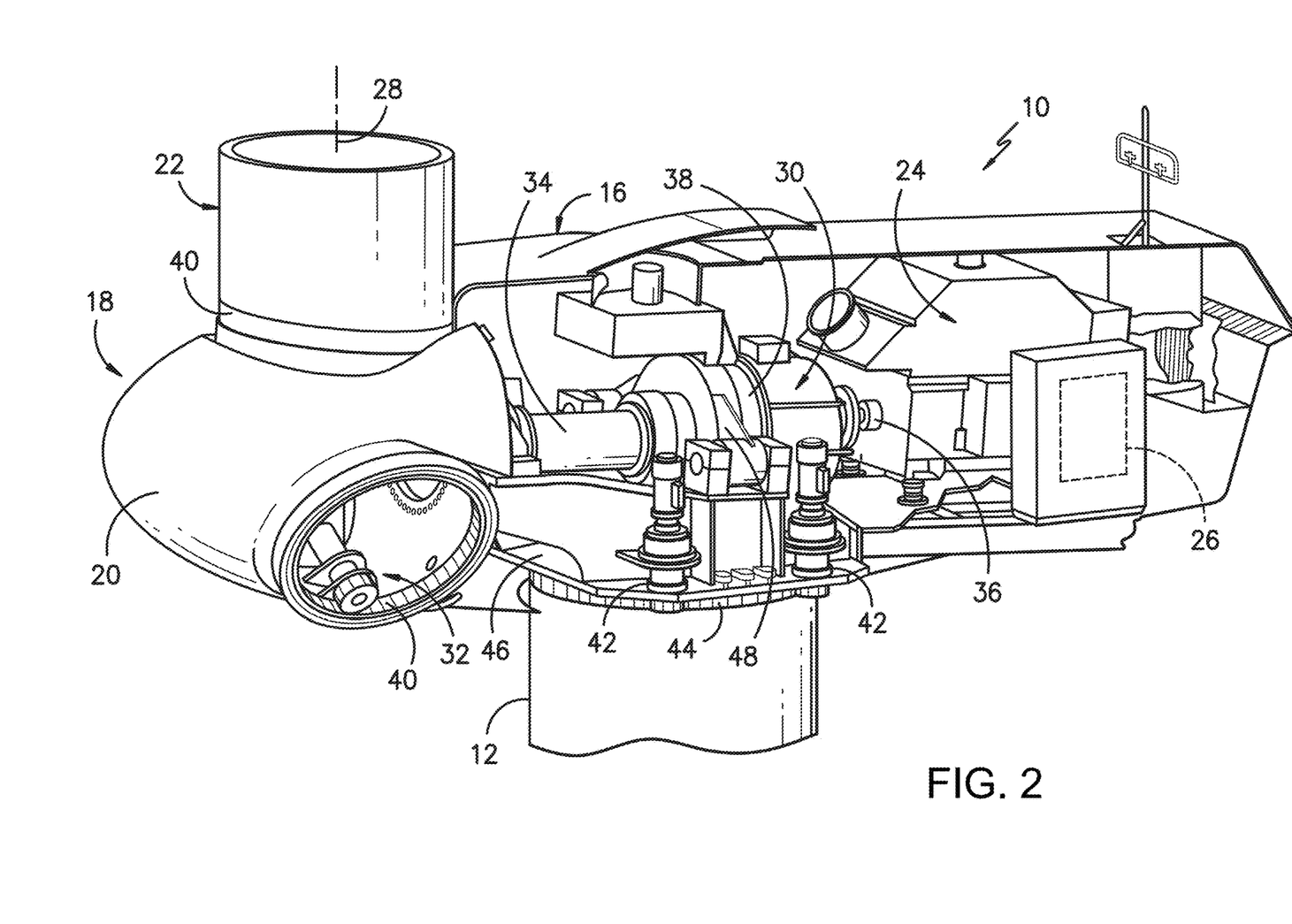
FIG. 2 illustrates a simplified, internal view of a nacelle of a wind turbine, particularly illustrating the nacelle during normal operation.

Referring now to FIG. 2, a simplified, internal view of the nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the rotor hub 20. Thus, the gearbox 30 converts the low speed, high torque input to a high speed, low torque output to drive the gearbox output shaft 36 and, thus, the generator 24.

Each blade 22 may also include a pitch adjustment mechanism 32 configured to rotate each blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

Generally, components of modern wind turbines can be very heavy. For example, a gearbox of some modern wind turbines may have a mass of about 45 metric tonnes. For installation, removal, exchange and/or servicing, wind turbine components may need to be lifted to or lowered from the nacelle or the rotor hub, or may need to be repositioned uptower. In embodiments of the present disclosure, components of a wind turbine to be moved using a crane may include main components of the wind turbine, particularly components of the nacelle such as a transformer and/or one or more drivetrain components, for example a gearbox or a generator. Additionally or alternatively, a component of a wind turbine to be lifted by a crane according to embodiments may include a rotor blade or a rotor blade segment of a rotor blade.

Cranes according to embodiments described herein are configured to be lifted to and mounted to the rotor hub. In particular, the cranes may be lifted in an assembled state. After mounting the crane to the rotor hub, the rotor hub is rotated to a different orientation, in which the crane can be used to lift a component of the wind turbine for service or installation operations. Advantageously, the crane may be mounted on the wind turbine in a brief period of time, particularly without long assembly times as for known ground-based cranes or known service cranes that are assembled on the nacelle. In some embodiments, mounting the crane on the rotor hub may provide more space for personnel and equipment within the nacelle. Access to the hatch from the nacelle to the tower may be improved, thereby particularly enhancing safety of uptower operations due to improved accessibility of the escape route. According to some embodiments, the crane may be transported on a truck to the wind turbine site, particularly in an already assembled state. Such transport may facilitate logistics and/or reduce or avoid on-site assembly operations.

According to embodiments of the present disclosure, a crane 50 is provided, which is configured to be mounted to a rotor hub 20 of a wind turbine 10. In particular, the crane 50 is an uptower crane. Specifically, the crane 50 may be configured for lifting one or more components of the wind turbine 10 while the crane is mounted to the rotor hub 20 uptower. Additionally or alternatively, the crane 50 may be used for lifting equipment for servicing one or more components of the wind turbine 10 and/or equipment for installing one or more components of the wind turbine 10. According to embodiments of the present disclosure, the crane 50 is a service crane or an installation crane, particularly for servicing and/or installing one or more components of a wind turbine.

In embodiments, the crane 50 includes a crane base 52 and a crane arm 60. In particular, the crane arm 60 is connected to the crane base 52. According to embodiments, the crane base 52 is configured for mounting the crane 50 to the rotor hub 20 of the wind turbine 10. In particular, the crane base 52 can include a connection portion 54 configured for fastening the crane base 52 to the rotor hub 20, more specifically for fastening the crane base 52 to a mounting portion 21 of the rotor hub 20. The connection portion 54 may be provided on a first side of the crane base 52. The crane arm 60 of the crane 50 may be connected to a second side of the crane base 52, the second side particularly being opposite the first side of the crane base 52.

The crane arm 60 may be rotatably mounted on the crane base 52. In particular, the crane 50 may include a crane arm rotation device 58 for rotating the crane arm 60 about a first crane axis with respect to the crane base 52. For example, the first crane axis may be directed at least substantially perpendicular to the first side and/or second side of the crane base 52. The crane arm rotation device 58 may include a motor for rotating the crane arm 60. In some embodiments, the crane 50 may include a crane arm pivoting device for pivoting the crane arm 60 or a crane arm segment about a second crane axis, particularly about a second crane axis perpendicular to the first crane axis. In particular, the crane arm pivoting device may include an actuator for pivoting the crane arm 60 or crane arm segment, particularly a pneumatic or hydraulic actuator. In some embodiments, the crane arm 60 may be a single rigid arm. In further embodiments, the crane arm 60 may include a segmented arm. In some embodiments, which can be combined with other embodiments, the crane arm 60 may include an extendable arm or extendable arm segment, which may particularly extend the arm length of the crane arm 60. For example, the extendable arm or extendable arm segment may include telescopic cylinders, particularly pneumatic or hydraulic telescopic cylinders.

Figure 3:
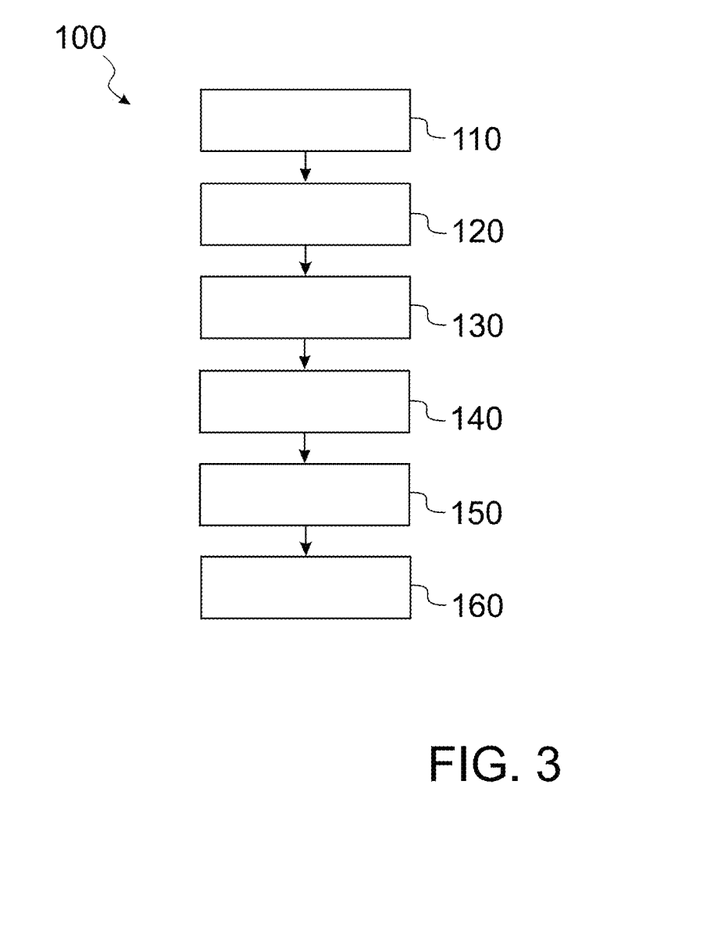
FIG. 3 illustrates a flow diagram of a method of servicing or installing a component of a wind turbine using a crane according to embodiments of the present disclosure.

FIG. 3 illustrates a method 100 of servicing or installing a component of a wind turbine 10 using a crane 50 according to embodiments of the present disclosure. The method 100 may include rotating the rotor hub 20 about the rotor axis of the rotor 18 to a first rotational position (block 110). In particular, the rotor hub 20 may be rotated such that a mounting portion 21 of the rotor hub 20 is directed in a downward direction. Herein, upward and downward are understood with respect to a vertical direction, specifically with respect to gravity. A downward direction is particularly understood as a direction having a downward direction component. An upward direction is particularly understood as a direction having an upward direction component. Thus, generally, upward directions and downward directions may deviate from a vertical upward direction and a vertical downward direction, respectively. For instance, to direct the mounting portion 21 in a downward direction, the rotor hub 20 may be rotated about the rotor axis of the rotor 18 such that the mounting portion 21 is positioned in the lower half of the rotor hub 20. In some embodiments, the mounting portion 21 may particularly be positioned at the lowest point of the rotor hub 20.

In embodiments, the rotational position of the rotor hub 20, particularly the first and second rotational positions referred to herein, may be defined by the angular position of the mounting portion 21 around the rotor axis, particularly by the angular position of the center of the mounting portion 21 around the rotor axis. According to some embodiments, in the first rotational position, an angular difference between the center of the mounting portion 21 and a vertical downward direction may be less than 60 degrees, particularly less than 30 degrees or less than 20 degrees. In particular, the center of the mounting portion 21 may be oriented in an at least substantially vertical downward direction. If the wind turbine has three blades 22 mounted to the rotor hub 20, a rotor blade 22 arranged on the rotor hub 20 on the opposite side of the mounting portion 21 may for example be oriented to the 12 o'clock position, the other two rotor blades 22 to the 4 o'clock and 8 o'clock positions, respectively. In particular, the mounting portion 21 may be positioned at the 6 o'clock position and may be accessible from below the rotor hub 20.

In embodiments, the mounting portion 21 is at least partially located on an outer surface of the rotor hub 20, particularly between two blade flanges of the rotor hub 20, more particularly in a circumferential direction between two blade flanges. In some embodiments, the rotor hub 20 may include a cast hub and a casing around the cast hub. The outer surface of the rotor hub may particularly refer to the outer surface of the cast hub. The method 100 may include removing at least a portion of the casing, particularly to expose the mounting portion before mounting the crane 50 to the mounting portion. In further embodiments, the rotor hub 20 may not have a casing around the cast portion of the rotor hub 20.

The mounting portion 21 of the rotor hub 20 may be configured to be connected with the connection portion 54 of the crane base 52 of the crane 50. In some embodiments, the mounting portion 21 may include at least one hole in the rotor hub 20, particularly a plurality of holes. For example, the mounting portion 21 may include at least two, particularly at least three, groups of holes, the groups being spaced apart from each other in the outer surface of the rotor hub 20. For example, the holes may be through holes extending from the outer surface of the rotor hub 20 through a rotor hub wall of the rotor hub 20 to the inside of the rotor hub 20.

According to embodiments, the method 100 includes lifting the crane 50 to the rotor hub 20 while the rotor hub 20 is positioned at the first rotational position (block 120). In particular, prior to lifting the crane 50, the crane 50 may be positioned below the rotor 18 of the wind turbine 10. The crane 50, particularly the crane base 52 of the crane 50, may be connected to a connecting device 82 such as to a hoisting line of a winch 80, particularly to a rope, a wire or a chain. In some embodiments, lifting the crane 50 to the rotor hub 20 includes lifting the crane 50 using a connecting device 82 arranged through the rotor hub 20. In particular, the connecting device 82 may be arranged through an opening in the rotor hub wall of the rotor hub 20. The opening for the connecting device 82 may be arranged for example in a region of the mounting portion 21 of the rotor hub 20. In some embodiments, the connecting device 82 may be guided by pulleys 84 between the winch 80 and the crane 50. For example, the winch 80 may be fixed uptower, e.g. within the nacelle 16 or within the rotor hub 20. In further embodiments, the winch 80 may be fixed at another location, for example on the ground near the wind turbine 10, the connecting device 82 being guided up to the nacelle 16 or the rotor hub 20 and back down to the crane 50.

According to some embodiments, the crane 50 may be lifted in an assembled state, particularly with the crane base 52 connected to the crane arm 60. The assembled state may particularly refer to a configuration of the crane base 52 and the crane arm 60, the configuration being suitable for normal operation of the crane 50. Lifting the crane 50 in an assembled state may avoid or reduce assembly time uptower.

In embodiments, the crane base 52 includes an attachment point for the connecting device 82, wherein the attachment point is arranged such that the crane 50 is suspended with the connection portion 54 facing in an upward direction while lifting the crane 50 using the connecting device 82. In particular, the attachment point may be arranged on the crane base 52 such that the first side of the crane base 52 faces in the upward direction. The second side of the crane base 52, on which the crane arm 60 is connected to the crane base 52, may face in a downward direction. In particular, the crane 50 may be lifted in an orientation that is essentially flipped with respect to the orientation of the crane 50 during normal operation of the crane 50.

According to embodiments, the crane 50 is lifted up to the rotor hub 20 until the crane 50 comes into contact with the rotor hub 20, particularly until the connection portion 54 of the crane 50 engages the mounting portion 21 of the rotor hub 20.

Figure 4:
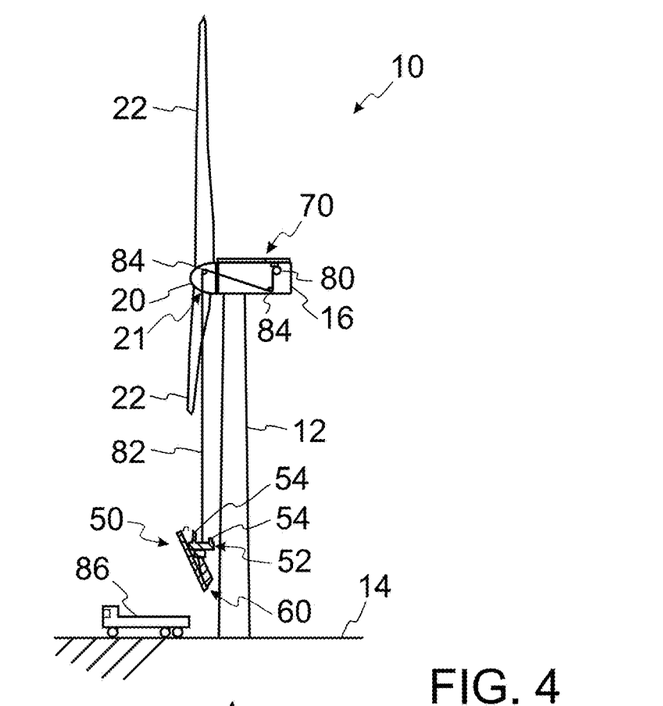
FIG. 4 shows a schematic view of a crane being lifted to the rotor hub of a wind turbine.

FIG. 4 illustrates a sectional view of a wind turbine 10 and a crane 50 being lifted from a truck 86 positioned on support surface 14 (ground) to the rotor hub 20. In some embodiments, the crane 50 may be transported to the wind turbine 10 on a truck 86, particularly already in an assembled state. As shown in FIG. 4, a connecting device 82 is attached to an attachment point of the crane base 52 of the crane 50. The crane 50 is lifted by a winch 80 positioned in the nacelle 16, the winch 80 winding up the connecting device 82.

Figure 5:
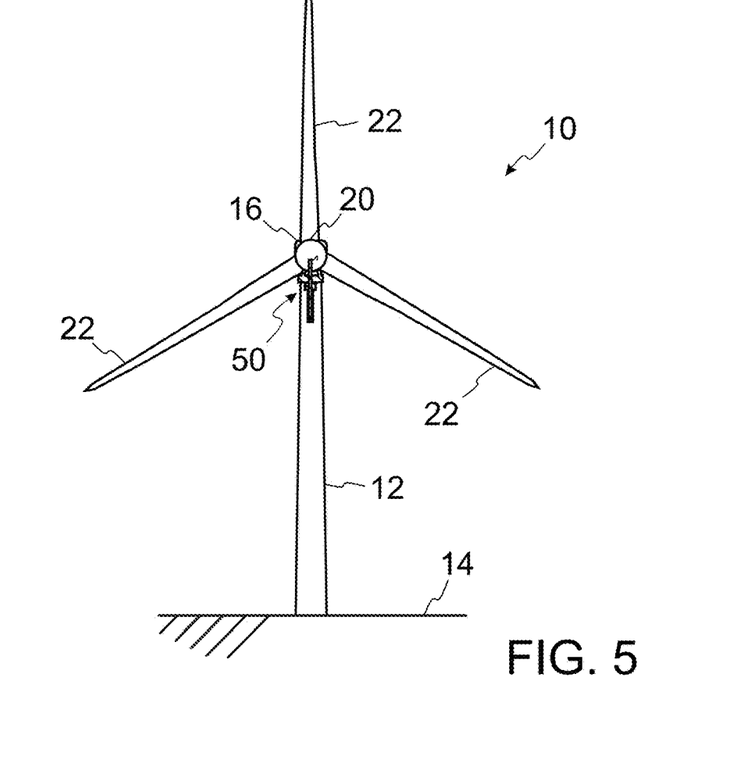
FIG. 5 shows a schematic view of a crane mounted to a mounting portion of the rotor hub.

According to embodiments of the present disclosure, the method 100 includes mounting the crane 50 to the mounting portion 21 of the rotor hub 20 while the rotor hub 20 is positioned at the first rotational position (block 130), particularly after lifting the crane 50 to the rotor hub 20. In particular, mounting the crane 50 to the rotor hub 20 can include fastening the crane 50, particularly the connection portion 54 of the crane 50, to the mounting portion 21 of the rotor hub 20. For example, FIG. 5 illustrates the crane 50 mounted to the rotor hub 20 of the wind turbine 10.

According to embodiments, the connection portion 54 is configured for fastening the crane base 52 to the rotor hub 20 while the crane 50 is oriented with the connection portion 54 facing in an upward direction. In some embodiments, at least one fastening operation, particularly all fastening operations, for fastening the crane 50 to the mounting portion 21 is performed inside the rotor hub 20. For example, the connection portion 54 of the crane base 52 may include a flange with threaded bolt holes. Bolts may be inserted through through holes of the rotor hub wall of the mounting portion 21 and into the threaded bolt holes of the flange to fasten the crane 50 to the rotor hub 20. Fastening the crane to the rotor hub using the bolts may particularly be performed from inside the rotor hub 20. In another example, the connection portion 54 of the crane base 52 may include threaded rods protruding from the first side of the crane base 52. In particular, while lifting the crane 50, the threaded rods may be oriented in an upward direction. The rods may be inserted through corresponding through holes in a rotor hub wall of the mounting portion 21 of the rotor hub 20. The crane 50 may then be fastened to the rotor hub 20 by tightening nuts on the threaded rods, particularly from the inside of the rotor hub 20. It should be understood that other connecting mechanisms may be used for fastening the crane base 52 to the rotor hub 20. Mounting the crane 50 from inside the hub may avoid a need for climbing technicians and/or increase safety during the mounting procedure. In further embodiments, one or more fastening operations for fastening the crane 50 to the mounting portion 21 may be performed from outside the rotor hub 20.

In some embodiments, the crane base 52 includes at least two connection portions 54 such as flanges for fastening the crane base 52 to the rotor hub 20, particularly at least three connection portions 54. The at least three connection portions may be non-collinearly arranged. The mounting portion 21 may have a corresponding arrangement of connection points, for example groups of holes arranged in a pattern corresponding to the connection portions 54 of the crane base 52. In embodiments, the connection portions 54 may be spaced apart from each other, for example at least one meter. The plurality of connection portions 54 may particularly be configured for supporting the crane 50 on the rotor hub 20 during rotation of the rotor hub 20 together with the crane 50. A crane 50 according to some embodiments may have a mass of more than 5 metric tonnes, particularly of more than 7 metric tonnes or more than 10 metric tonnes. In embodiments, the crane 50 is mounted to the mounting portion 21 of the rotor hub 20 such that the rotor hub 20 is rotatable together with the crane 50 from the first rotational position to a second rotational position.

Figure 6:
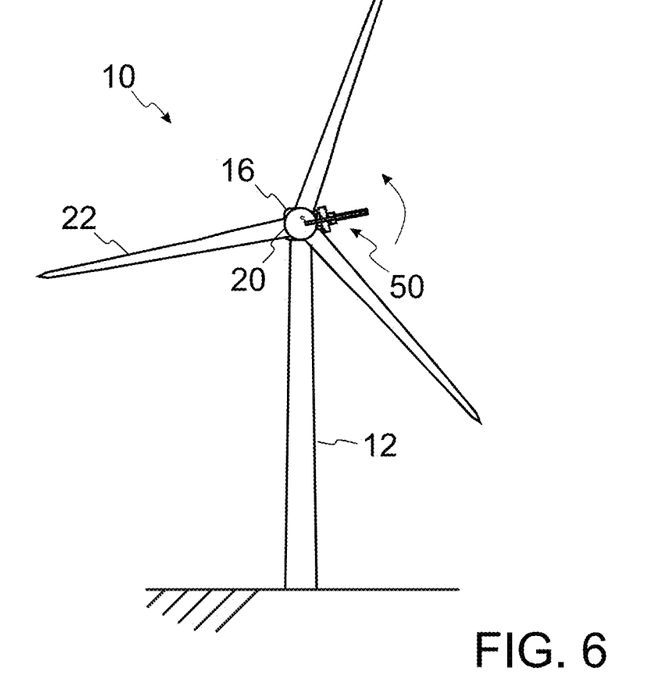
FIG. 6 shows a schematic view of a wind turbine with a rotor hub being rotated together with a crane mounted on the rotor hub.
Figure 7:
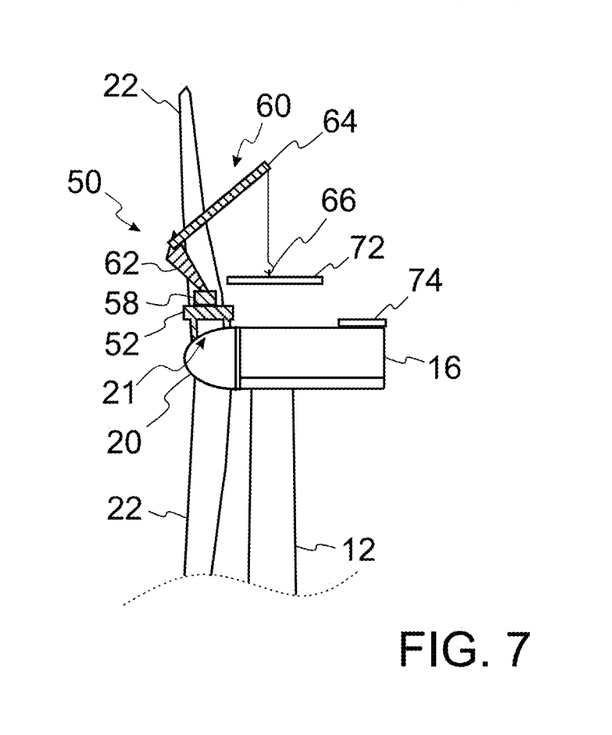
FIG. 7 shows a schematic view of a crane mounted on the rotor hub, the crane lifting a roof portion off the nacelle.

According to embodiments, the method 100 includes rotating the rotor hub 20 together with the crane 50 from the first rotational position to a second rotational position (block 140), particularly after mounting the crane 50 to the mounting portion 21 of the rotor hub 20. The second rotational position is different from the first rotational position. For example, FIG. 6 illustrates the rotor hub 20 and the crane 50 being rotated together about the rotor axis from the first rotational position (FIG. 5) to a second rotational position, for instance to a second rotational position in which the mounting portion 21 faces in a vertically upward direction as illustrated in FIG. 7.

In some embodiments of the present disclosure, in the second rotational position, the mounting portion 21 of the rotor hub 20 is directed in an upward direction. In particular, the mounting portion 21 is positioned in the upper half of the rotor hub 20. More specifically, in the second rotational position, an angular difference between the center of the mounting portion 21 and a vertical upward direction may be less than 60 degrees, particularly less than 30 degrees or less than 20 degrees. In some embodiments, the center of the mounting portion 21 may be oriented in an at least substantially vertical upward direction.

The rotor hub 20 may be rotated from the first rotational position to the second rotational position using a drive tool installed in the nacelle 16. The drive tool may be configured for rotating a main shaft 34 of the wind turbine 10, the main shaft 34 being coupled to the rotor hub 20. In some embodiments, to rotate the main shaft 34, the drive tool may be coupled to a high speed shaft (gearbox output shaft 36) of the wind turbine 10, the high speed shaft being coupled to the main shaft 34 and the rotor hub 20 via a gearbox 30 of the wind turbine 10. The drive tool may be for example a drive tool used for turning an imbalanced rotor 18 of a wind turbine 10 during single blade installation. Such a drive tool may sometimes be referred to as unbalanced rotor turning gear drive. For instance, the drive tool may be installed on the backside of the gearbox. The drive tool may mesh with teeth on a brake disc of the high speed shaft to rotate the high speed shaft, the main shaft 34 and the rotor hub 20. The drive tool may provide the torque for turning the rotor hub 20 together with the crane 50 from the first rotational position to the second rotational position. The drive tool may be a dedicated device, particularly not the generator.

According to some embodiments, the method 100 may include lifting at least a portion of a roof 70 of the nacelle 16 using the crane 50 (block 150) after rotating the rotor hub 20 together with the crane 50 from the first rotational position to the second rotational position. Lifting the roof 70 or a roof portion can provide access for the crane 50 to components of the wind turbine 10 arranged within the nacelle 16. For example, FIG. 7 illustrates a crane 50 mounted on the rotor hub 20 and rotated to a second rotational position, in which the mounting portion 21 and the crane 50 are oriented in a vertical upward direction. The crane arm 60, which includes a first crane arm segment 62 and a second crane arm segment 64, has been rotated towards the nacelle 16 using the crane arm rotation device 58. A first roof portion 72 of the roof 70 is attached to a crane hook 66 of the crane 50. The crane 50 is used to lift the first roof portion 72 from the nacelle 16. Subsequently, the first roof portion 72 can be lowered to the ground. In FIG. 7, a second roof portion 74 remains on the nacelle 16. After removing the first roof portion 72, the crane 50 can access the interior of the wind turbine, particularly for lifting a wind turbine component of the nacelle 16.

In some embodiments, the crane 50 further includes at least one load supporting arm 56 connectable to the crane base 52 and the nacelle 16. The method 100 may include connecting the at least one load supporting arm 56 of the crane 50 to the nacelle 16 (block 160). In particular, the at least one load supporting arm 56 of the crane 50 may be connected to the nacelle 16 after rotating the rotor hub 20 together with the crane 50 from the first rotational position to the second rotational position, and more particularly after lifting the roof 70 or roof portion from the nacelle 16. The load supporting arm 56 may particularly support a load lifted by the crane 50 and/or stabilize the crane 50 with respect to the nacelle 16.

Figure 8:
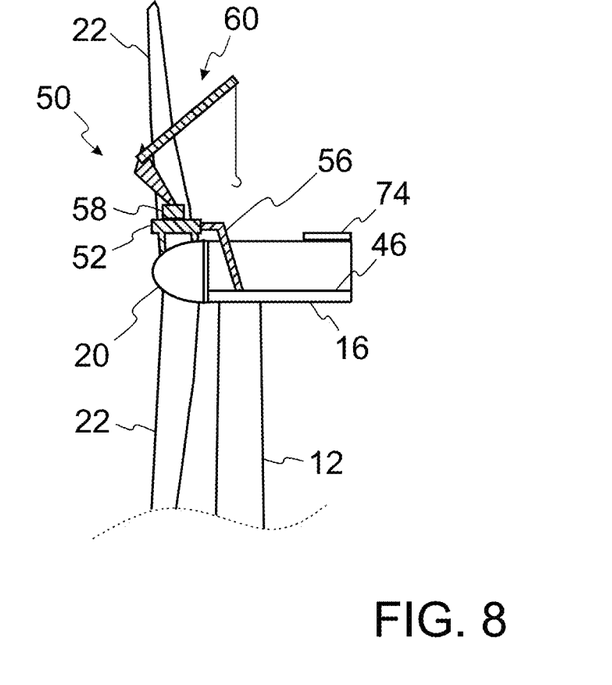
FIG. 8 shows a schematic sectional view of a crane with load supporting arms connected to the bedplate of the nacelle.

According to some embodiments, each of the at least one load supporting arm 56 includes a first end connected to or configured to be connected to the crane base 52, and a second end configured for connection to the nacelle 16. The second end may for example include a flange portion for connection to the nacelle 16. In some embodiments, the at least one load supporting arm 56 can be mounted to a bedplate 46 of the nacelle 16. In particular, a flange portion of the second end of the at least one load supporting arm 56 may be fastened to one or more attachment points of the bedplate 46. The at least one load supporting arm 56 may particularly be mounted to the bedplate 46 if the rotor hub 20 is rotated such that the crane 50 is positioned at the top of the rotor hub 20. For example, FIG. 8 illustrates a crane 50 with a load supporting arm 56 having a first end connected to the crane base 52 of the crane 50 and a second end connected to the bedplate 46 of the nacelle 16.

In some embodiments, the at least one load supporting arm 56 may be connected to the crane base 52 before lifting the crane 50 to the rotor hub 20. For example, the at least one load supporting arm 56 may be connected to the crane base 52 via an actuator, particularly a hydraulic actuator. The actuator, particularly including a hydraulic folding mechanism, may be configured to fold the second end of the at least one load supporting arm from an extended position back towards the crane base into a retracted position, and from the retracted position away from the crane base to the extended position. The at least one load supporting arm 56 may be in the retracted position before rotating the rotor hub to the second rotational position and particularly before removing the roof 70 or a roof portion. The actuator may then extend or fold down the second end of the at least one load supporting arm 56 towards the nacelle, particularly such that the second end can be mounted to the bedplate 46. In further embodiments, the at least one load supporting arm 56 may include one or more separate parts which can be connected to the bedplate 46 and the crane base 52 uptower.

According to embodiments, the at least one load supporting arm 56 can include at least two load supporting arms 56, particularly exactly two load supporting arms. In embodiments, at least one or exactly one load supporting arm 56 may be mounted to the bedplate 46 on each side of the main shaft 34. The at least one load supporting arm 56 according to embodiments described herein may advantageously act as a lever to provide side stabilization for the crane 50, support reaction loading and/or increase a lifting capacity of the crane 50, particularly by transmitting loads from the crane 50 to the bedplate 46. In particular, the loading of the rotor and/or main bearing may be reduced.

Figure 9:
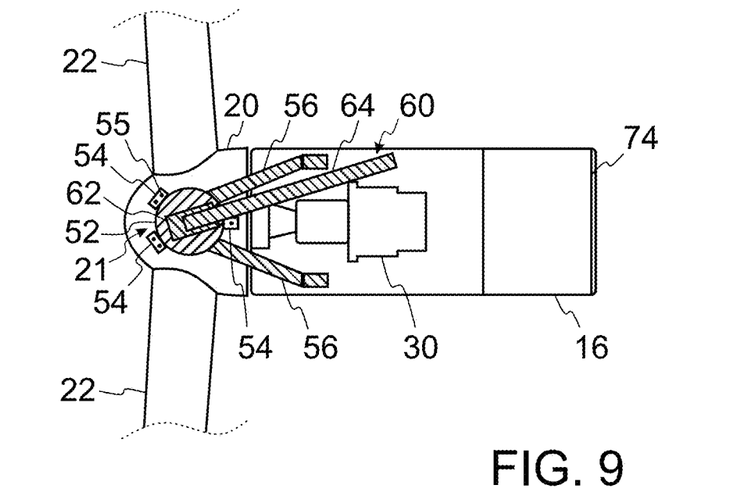
FIG. 9 shows a schematic top view of a crane mounted on the rotor hub and with load supporting arms connected to the bedplate of the nacelle.

FIG. 9 illustrates a top view onto a crane 50 according to an exemplary embodiment, the crane 50 being mounted on a wind turbine as explained in connection with embodiments of method 100. The crane 50 is mounted to a mounting portion 21 of the rotor hub 20, the mounting portion 21 being arranged between two rotor blades 22 of the wind turbine 10. A crane base 52 of the crane 50 is mounted to the mounting portion 21 via flanges and bolts 55 of a plurality of connection portions 54. The crane 50 includes a crane arm rotation device 58 (not shown in FIG. 9) on the crane base 52 for rotating the crane arm 60 of the crane 50 about a vertical first crane axis. The crane arm 60 is a segmented crane arm including a first crane arm segment 62 and a second crane arm segment 64. The second crane arm segment 64 is actuatable to pivot with respect to the first crane arm segment 62 about a horizontal second crane axis. A portion of the roof 70 has been removed using the crane 50. The crane base 52 is connected to the bedplate 46 of the nacelle 16 via two load supporting arms 56, one being connected to the bedplate 46 on each side of the drivetrain. The crane 50 may be used to lift a wind turbine component of the nacelle 16, e.g. a drivetrain component such as the gearbox 30.

Figure 10:
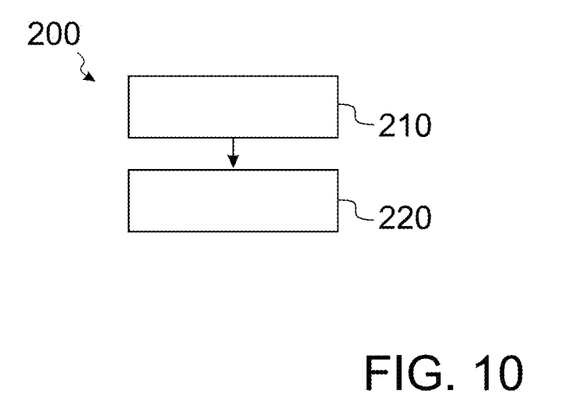
FIG. 10 illustrates a flow diagram of a method of servicing or installing a component of a wind turbine according to embodiments of the present disclosure.

According to embodiments of the present disclosure, a method 200 of servicing or installing a component of a wind turbine 10 is provided, as illustrated for example in FIG. 10. The method 200 includes arranging a crane 50 on the wind turbine (block 210) according to embodiments described herein, for example as described in connection with method 100 (FIG. 3). It should be understood that in further embodiments, arranging the crane 50 on the wind turbine may involve only some of the operations or steps described in connection with method 100.

Figure 11:
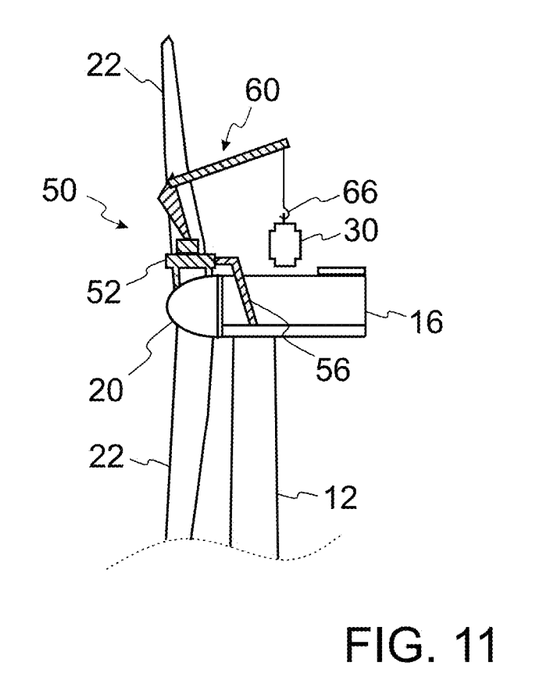
FIG. 11 shows a schematic view of a crane during servicing of a gearbox.

In embodiments, the method 200 includes lifting a component of the wind turbine 10 using the crane 50 (block 220). In particular, the component of the wind turbine 10 may be a component of a drivetrain of the wind turbine 10 such as a gearbox 30 or a generator 24. For instance, FIG. 11 illustrates a schematic sectional view of a wind turbine 10 with a crane 50 which has been mounted on the rotor hub 20 and rotated to a second rotational position. The crane 50 lifts a gearbox 30 of the wind turbine using a crane hook 66 secured to the gearbox 30. In further embodiments, the crane 50 may lift further components of the nacelle such as a transformer, and/or equipment for servicing or installing components of the wind turbine 10. In embodiments, lifting the component of the wind turbine 10 for servicing the component may include lifting the component out of the nacelle 16. The component of the wind turbine 10 may be lowered to the ground, e.g. for repair. The crane 50 may further lift the repaired component or a replacement component from the ground to the nacelle 16. In further embodiments, the crane 50 may lift a component of the wind turbine 10 to reposition the component in the nacelle 16 to provide access for servicing operations in the nacelle 16.

Figure 12:
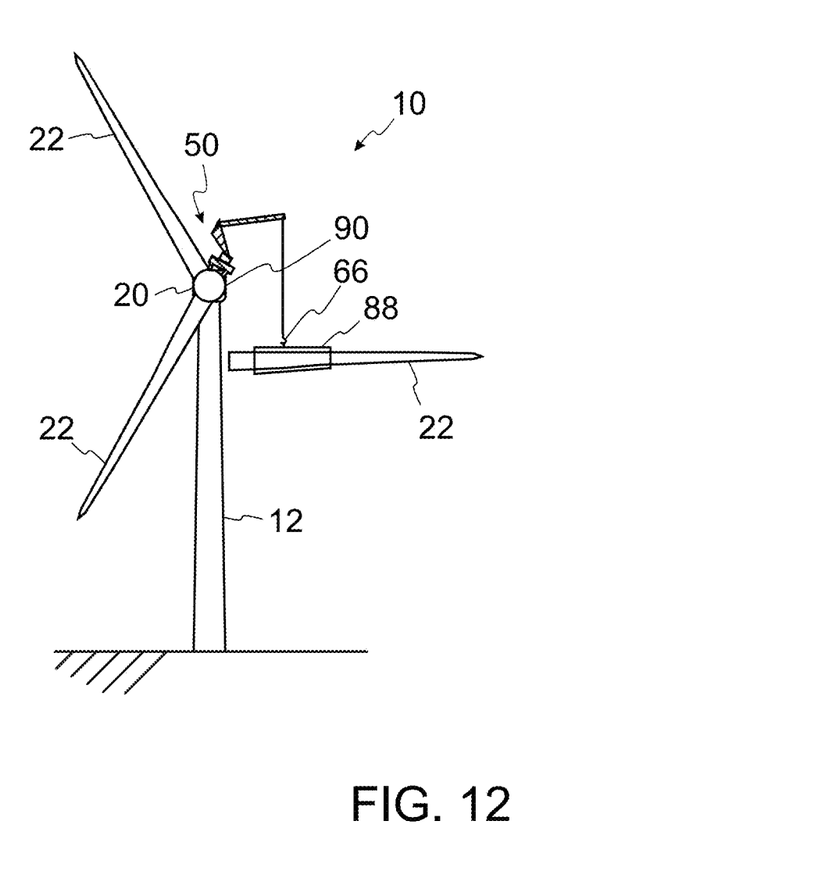
FIG. 12 shows a schematic view of a crane during installation of a rotor blade.

According to some embodiments, the component of the wind turbine 10 lifted by the crane 50 may be a rotor blade 22 or a rotor blade segment of the wind turbine 10. In particular, the crane 50 may lift a rotor blade 22 or rotor blade segment for installing or exchanging one or more rotor blades 22 of the wind turbine 10. In some embodiments, before lifting the rotor blade 22 or a rotor blade segment, the rotor hub 20 may be rotated together with the crane 50 to a second rotational position, which is different from a vertical upward direction. For example, the crane 50 may be positioned centrally between two blade flanges, the two blade flanges including a first blade flange to which a rotor blade 22 or blade segment is to be mounted. The crane 50 may be oriented at approximately 30 degrees from a vertical upward direction towards the first blade flange. Such a situation is illustrated for example in FIG. 12, wherein a crane 50 lifts a full rotor blade 22 to be connected to a first blade flange 90. The first blade flange 90 is particularly positioned at the 3 o'clock position. The rotor blade 22 is lifted using a blade holder 88 secured to a crane hook 66 of the crane 50. In embodiments, the crane 50 may lift a rotor blade 22 for a first installation of the rotor blade 22 at the rotor hub 20, lift a repaired rotor blade 22 for re-installation of the rotor blade 22, or lift a replacement rotor blade 22 for installation at the rotor hub 20 during a rotor blade exchange.

According to embodiments of the present disclosure, which may be combined with other embodiments, the crane 50 may be configured to lift any of the components of a wind turbine 10 referred to herein, particularly while the crane 50 is mounted on the wind turbine 10. The crane 50 may be configured to lift a wind turbine component having a mass of at least 10 metric tonnes, particularly of at least 15 metric tonnes or of at least 20 metric tonnes. In some embodiments, the crane arm 60 may have a length of at least 3 m, particularly of at least 5 m or of at least 7 m. Herein, a component of the wind turbine may also be referred to as a wind turbine component.

In embodiments of the present disclosure, the crane 50 may include a hoisting line, a crane hook 66 on the hoisting line and/or a crane winch for the hoisting line. It should be understood that the hoisting line may be provided as a hoist rope, a wire rope, a chain or other suitable connecting device. In some embodiments, the winch of the crane 50 is fixed to one or more other parts of the crane 50, e.g. to the crane base 52. In further embodiments, the winch may be separate from the crane 50. In particular, the hoisting line of the crane 50 may be arranged or guided by pulleys to the crane 50 and particularly to the crane arm 60 of the crane 50. For example, the winch may be positioned on the ground, while the crane 50 operates uptower, the hoisting line of the crane 50 extending between the winch and the crane arm 60. Leaving the winch on the ground may reduce the weight to be lifted uptower.

According to some embodiments, an orientation of the crane base 52 with respect to the outer surface of the rotor hub 20 may be adjustable. Adjusting the orientation may be performed by an actuator, particularly a hydraulic actuator. For example, the height of one or more connection portions 54 between the first side of the crane base 52 and the outer surface of the rotor hub 20 may be adjusted such that the crane base 52 is tilted with respect the outer surface of the rotor hub 20. In particular, the actuator may be used to tilt the crane base 52 towards a horizontal orientation. Adjusting the orientation of the crane base 52 may be advantageous for example if the crane 50 is to be used at a second rotational position which deviates from a vertical upward direction, as shown for example in FIG. 12. A crane base 52 tilted towards a horizontal orientation may provide improved support for the crane 50 during a lifting operation.

Embodiments of the present disclosure may provide for example the advantage that a rigging time for lifting a crane uptower can be reduced. In some embodiments, the crane may be installed on the wind turbine within a very short time such as a few hours. In particular, cranes according to embodiments may dispense with time-consuming assembly after transport to the wind turbine site. For example, a crane according to some embodiments may be transported with a single truck and lifted to the rotor hub without time-consuming assembly steps on the ground. The crane may further be lifted and mounted already in an assembled state, thus reducing the number of lifting operations and/or uptower assembly steps. The use of cranes described herein may provide more space uptower, particularly in the nacelle, for servicing or installation operations and/or for escape routes for personnel. Embodiments of the present disclosure may reduce the time for servicing and/or installation of components of a wind turbine, reduce crane costs, personnel costs, and/or improve safety of uptower operations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method of servicing or installing a component of a wind turbine using a crane, the wind turbine including a nacelle and a rotor hub coupled to the nacelle and rotatable about a rotor axis, the method comprising:
   rotating the rotor hub about the rotor axis to a first rotational position;
   lifting the crane to the rotor hub while the rotor hub is positioned at the first rotational position;
   wherein the crane includes a crane base, the method comprising mounting the crane base to a mounting portion of the rotor hub while the rotor hub is positioned at the first rotational position;
   rotating the rotor hub together with the crane from the first rotational position to a second rotational position; and
   after rotating the rotor hub together with the crane from the first rotational position to the second rotational position, connecting at least one load supporting arm from the crane base into the nacelle through an access in a roof of the nacelle to a bedplate of the nacelle.

2. The method of claim 1, further comprising using a connecting device arranged through the rotor hub for lifting the crane to the rotor hub.

3. The method of claim 1, wherein mounting the crane to the mounting portion comprises fastening the crane base to the mounting portion in a fastening operation performed inside the rotor hub.

4. The method of claim 1, wherein the mounting portion is at least partially located on an outer surface of the rotor hub between two blade flanges of the rotor hub.

5. The method of claim 1, wherein the rotor hub is rotated from the first rotational position to the second rotational position using a drive tool installed in the nacelle to rotate a main shaft of the wind turbine coupled to the rotor hub.

6. The method of claim 1, further comprising;
   after rotating the rotor hub together with the crane from the first rotational position to the second rotational position, providing the access for the load supporting arm through the roof of the nacelle by lifting at least a portion of the roof of the nacelle using the crane.

7. The method of claim 1, wherein, in the first rotational position, the mounting portion of the rotor hub is directed in a downward direction.

8. The method of claim 7, wherein, in the second rotational position, the mounting portion of the rotor hub is directed in an upward direction.

9. The method of claim 1, further comprising:
lifting the component of the wind turbine using the crane.

10. The method of claim 9, wherein the component of the wind turbine is a component of a drivetrain of the wind turbine.

11. The method of claim 9, wherein the component of the wind turbine is a rotor blade or a segment of a rotor blade.

\* \* \* \* \*